United States Patent
Ellsworth et al.

(10) Patent No.: US 8,404,172 B2
(45) Date of Patent: Mar. 26, 2013

(54) METHODS OF PROCESSING HIGH SERVICE TEMPERATURE HYDROCARBON GELS

(75) Inventors: Mark W. Ellsworth, Dublin, CA (US); Michael A. Oar, San Francisco, CA (US)

(73) Assignee: Tyco Electronics Corporation, Berwyn, PA (US)

( * ) Notice: Subject to any disclaimer, the term of this patent is extended or adjusted under 35 U.S.C. 154(b) by 149 days.

(21) Appl. No.: 12/954,532

(22) Filed: Nov. 24, 2010

(65) Prior Publication Data

US 2012/0126455 A1    May 24, 2012

(51) Int. Cl.
    *B29C 45/00*        (2006.01)
    *C08J 9/10*         (2006.01)
    *C08L 51/06*        (2006.01)

(52) U.S. Cl. .................. 264/328.17; 521/139; 524/504; 525/50

(58) Field of Classification Search ............. 264/328.17, 264/299; 524/504; 521/90, 139; 525/50
See application file for complete search history.

(56) References Cited

U.S. PATENT DOCUMENTS

| | | | |
|---|---|---|---|
| 5,149,334 A * | 9/1992 | Lahrman et al. ............. | 604/367 |
| 5,412,022 A | 5/1995 | Andres et al. | |
| 5,849,824 A * | 12/1998 | Mercer et al. ................ | 524/297 |
| 6,207,752 B1 | 3/2001 | Abraham et al. | |
| 6,653,408 B1 | 11/2003 | St. Clair | |
| 6,756,440 B2 | 6/2004 | Hase et al. | |
| 7,169,849 B2 * | 1/2007 | Ikuji et al. ....................... | 525/88 |
| 7,608,668 B2 | 10/2009 | Shan et al. | |
| 2002/0065356 A1 | 5/2002 | Crevecoeur et al. | |
| 2005/0288436 A1 | 12/2005 | Ring et al. | |
| 2006/0084740 A1 | 4/2006 | Kao et al. | |
| 2006/0278425 A1 | 12/2006 | Harada et al. | |
| 2007/0270553 A1 | 11/2007 | Bohm et al. | |
| 2008/0114102 A1 | 5/2008 | Balfour et al. | |
| 2009/0124743 A1 | 5/2009 | Lee | |
| 2010/0087079 A1 | 4/2010 | Pyun et al. | |
| 2011/0015350 A1 * | 1/2011 | Ellsworth et al. ............. | 525/245 |

FOREIGN PATENT DOCUMENTS

| | | |
|---|---|---|
| CN | 101469100 A | 7/2009 |
| CN | 101649081 A | 2/2010 |
| DE | 19920799 A1 | 11/2000 |
| EP | 0879832 A1 | 11/1998 |
| EP | 1548078 A1 | 12/2004 |
| EP | 1582203 A1 | 10/2005 |
| EP | 1770119 A1 | 4/2007 |
| JP | 55-129442 A | 10/1980 |
| JP | 2000-34454 A | 2/2000 |
| JP | 2007-51195 A | 3/2007 |

(Continued)

OTHER PUBLICATIONS

"An Introduction to Kraton Polymers: Structure, Chemistry, Performance", Kraton Polymers, 2008.

(Continued)

*Primary Examiner* — Jill Heitbrink

(57) ABSTRACT

Methods of processing high service temperature crosslinked thermoplastic gels are provided. The methods include combining (a) an oil-swelled physically crosslinked thermoplastic elastomer gel comprising at least one functional group configured to chemically crosslink in the presence of a crosslinker and (b) a crosslinker; maintaining the combination of the physically crosslinked thermoplastic elastomer gel and the crosslinker at a temperature at which they remain substantially unreacted; subsequently heating the combination to a temperature at which the oil-swelled physically crosslinked thermoplastic elastomer gel reacts with the crosslinker.

22 Claims, 4 Drawing Sheets

FOREIGN PATENT DOCUMENTS

| | | |
|---|---|---|
| JP | 2007-277390 A | 10/2007 |
| WO | WO-98/40436 A1 | 9/1998 |
| WO | WO-00/26285 A1 | 5/2000 |
| WO | WO-01/92344 A2 | 12/2001 |
| WO | WO-03/068878 A2 | 8/2003 |
| WO | WO-2008/004376 A1 | 1/2008 |

OTHER PUBLICATIONS

"Dow Product Selection Guide for Engage Polyolefin Elastomers", The Dow Chemical Company, Jun. 2009.

Ansems et al., "Oil Extension of Olefin Block Copolymers", *ANTEC Conference Proceedings*, vol. 2, p. 959-963, 2007.

Batra et al., "Highly Oil-Extended Olefin Block Copolymers", *ANTEC Conference Proceedings*, p. 855-859, 2009.

Chang et al., "Morphology and Flame-Retardancy Properties of Ternary High-Impact Polystyrene/Elastomer/Polystyrene-Encapsulated Magnesium Hydroxide Composites", *Journal of Applied Polymer Science*, vol. 108, p. 2488-2493, 2008.

Francois Chambon and H. Henning Winter, "Stopping of Crosslinking Reaction in a PDMS Polymer at the Gel Point", *Polymer Bulletin*, 13, p. 499-503, 1985.

International Search Report for International Application No. PCT/US2011/062083, dated Feb. 16, 2012.

International Search Report for International Application No. PCT/US2011/062088, dated Jun. 13, 2012.

Ishikawa et al., "Thermal Behaviors and Flame-Retardancy of Styrene-Ethylene-butadiene-Styrene-block Copolymer Containing Various Additives", *Journal of Applied Polymer Science*, vol. 104, p. 156-161, 2007.

Kibble et al., "Mechanical Properties and Flame Retardancy of SEBS-Based Composites Filled with Aluminium Hydroxide", *Polymers and Polymer Composites*, vol. 16, No. 7, p. 423-430, 2008.

Taubert et al., "Novel Polyimide Ionomers: $CO_2$ Plasticization, Morphology, and Ion Distribution", Polymer, 44, p. 1881-1892, 2003.

Wang et al., "The Gelation Behaviors of the Reactive Blends of Nylon1212 and Functional Elastomer", *Journal of Materials Science*, vol. 43, p. 5755-5762, 2008.

Wang-Dong Xiao, Kevin A. Kibble, Feng Lin, "Mechanical Properties and Flame Retardancy of SEBS-based Composites with Magnesium Hydroxide", *Polymers and Polymer Composites*, vol. 17, No. 2, 2009, p. 117-125.

Zhou et al., "A Study on Flame-retardant Technology of SEBS", *Fine Chemical Intermediates*, vol. 36, No. 3, p. 52-54, Jun. 2006.

International Search Report for International Application No. PCT/US2011/062080, dated Feb. 21, 2012.

David J. St. Clair, "Temp Service", *Adhesives Age*, Sep. 2001, p. 31-40.

\* cited by examiner combining
- (a) an oil-swelled physically crosslinked thermoplastic elastomer gel comprising at least one functional group configured to chemically crosslink in the presence of a crosslinker and
- (b) a crosslinker

↓ maintaining the combination of the physically crosslinked thermoplastic elastomer gel and the crosslinker at a temperature at which they remain substantially unreacted

↓ subsequently heating the combination to a temperature at which the oil-swelled physically crosslinked thermoplastic elastomer gel reacts with the crosslinker

Fig. 1

METHODS OF PROCESSING HIGH SERVICE TEMPERATURE HYDROCARBON GELS

BACKGROUND

This application relates to polymer gels, in particular methods of processing hydrocarbon gels.

In today's modern electrical and electronic devices, as well as in other uses such as fiber optic connections, sealants are often used for insulation, for protection against water, corrosion and environmental degradation, optical index matching, and thermal management. Prior to now, a number of sealants including gels have been known, however, processing gels in a cost effective, efficient, and effective manner has been a challenge.

As technology progresses, sealants will be subjected to increasingly higher temperature environments and more demanding performance requirements. There has been, and there presently exists, a need for high performance sealants to meet these demands. For example, there is an increasing need for high service gel sealants for use in outdoor energy transmission applications and for use near engine compartments. As the need for high performance sealants increase, so also, does the need for improved processing methods. In particular, improved processing methods for crosslinked gels are needed.

Gels, for example, have been used as sealants with relative success in certain applications due to their unique properties. Gels may have a lower hardness than rubber and can seal and conform under adequate compression. Gels may also be more elastic than mastics. Other advantages of gels are known in the art. For example, gels, when used as sealants, may be removed and re-entered more easily due to elastic recovery of the gel. For further example, relatively little force is required to change the shape of a soft gel sealant.

Solid particulates have been added to alter a gel's properties. However, one of the problems with flame retarding a soft gel is that the addition of solid particulate fillers leads to hardening and produces a gel with poor sealing properties. Other disadvantages of gels are known in the art.

One class of gels used as a sealant is thermoplastic elastomer gels (TPEGs). Certain TPEGs have advantages over other classes of gels such as silicone gels, polyurethane gels, and polybutadiene gels. For example, silicone gels may have a higher cost compared to TPEGs, a silicone gel's dielectric breakdown voltage may be adversely affected by humidity, and low surface energy silicone oils can leak or evaporate out of the gel and spread over electrical contact points leading to problematic insulation barriers. Problems with polyurethane and polybutadiene gels include, for example, hydrolytic instability of the crosslinked network; and degradation and hardening with aging. In addition, environmental concerns regarding certain non-TPEGs have led to an increased interest in developing gels with enhanced safety profiles while achieving sufficient or enhanced properties.

TPEGs have provided many years of reliable in-field performance for applications requiring a low maximum service temperature of approximately 70° C. TPEGs have been made that comprise a styrene ethylene/butylene styrene ("SEBS") triblock copolymer swollen with a mineral oil softener. While the thermoplastic nature of these gels allows for easy production, it limits the upper service temperature due to creep and flow as in-field ambient temperatures approach the styrene glass transition. Research has been aimed at increasing the upper service temperature of these gels through chemically crosslinking the gel network in order to form a thermoset gel structure. For example, oil-swelled acid/anhydride modified maleic anhydride SEBS gels have been covalently crosslinked using small molecule crosslinkers like di- and triamines, European Patent Publication No. EP 0879832A1, as well as with some metal salts, D. J. St. Clair, "Temp Service," Adhesives Age, pp. 31-40, September 2001. Crosslinked polymers are known to increase thermal stability, toughness, and chemical resistance compared to their base, or uncrosslinked polymers. However, crosslinked polymers are also known to often be intractable, making them difficult to reprocess or recycle.

Thermoset gels, in contrast to thermoplastic gels, are not plasticized upon heating due to the chemically crosslinked network within the gel. Thermoset gels include silicone gels and other types of gels that are used in many industries. Thermoset gels may provide the advantage of high service temperatures imparted by a chemically crosslinked network. However, processing of silicone gels is very different from processing TPEGs. Processing silicone gels typically requires the use of sensitive transition metal catalysts to generate the crosslinked gel network. Typically a two-part system is employed, where a first part includes silicone oil, a vinylsilane polymer, and a platinum catalyst. A second part includes the silicone oil and a silylhydride crosslinker. The first and second parts are then typically dispensed into the part and the material gels upon reaction between the vinylsilane and silylhydride.

Traditional thermoplastic elastomer gels are plasticized by heat and can be easily processed when molten. Styrenic block copolymers are typically used in TPEGs and these polymers form a physically crosslinked network of glassy styrene domains within the mineral oil extender fluid. At temperatures below the $T_g$ of styrene, the gel is stable and does not flow, but raising the temperature above the styrene $T_g$ will cause the gel to flow. These thermoplastic properties allow for easy processing of these gels into a usable part.

Typically, the components of the gel are mixed in a large drum using high shear and temperatures in the range of 177-220° C. Alternatively, the gel components are compounded using an extruder or Banbury mixer and then dispensed while molten into a large drum. Once the gel cools and sets it is sent to a manufacturing facility where a drum melter with a heated piston pushes into the drum, melting the contacted gel layer and subsequently dispensing the molten gel into the housing of a part.

A number of problems with processing gels are known in the art. For example, when processing a crosslinked gel that contains both a crosslinked polymer network with a miscible fluid, the miscible fluid may diffuse out of the gel.

U.S. Pat. No. 6,207,752 to Abraham et al. relates to low oil swell carboxylated nitrile rubber-thermoplastic polyurethane vulcanizate compositions. The nitrile rubbers of Abraham contain pendant carboxyl groups that can be crosslinked. The patentees report unexpectedly discovering that a processing aid can improve the processability of the compositions. The patent lists a number of processing aids including maleated polyethylene, maleated styrene-ethylene-butene-styrene-block copolymers and maleated styrene-butadiene-styrene-block copolymers, and maleated ethylene-propylene rubber.

U.S. Pat. No. 6,756,440 to Hase et al. relates to a fire resistant resin composition, a method of making the resin composition and an electrical wire comprising the composition. The composition has a halogen-free propylene resin containing propylene as a monomer component, a halogen-free styrene-based thermoplastic elastomeric resin modified with an unsaturated carboxylic acid or a derivative of such an acid, and a fire resistant metal hydroxide.

U.S. Published Patent Application No. 2002/0065356 to Crevecoeur et al. relates to flame retardant polymers with a condensation polymer, a halogen-containing styrene polymer, a polymer derived from aromatic vinyl monomer, and elastomeric polymer segments. The polymers derived from aromatic vinyl monomers may be crosslinked.

BRIEF SUMMARY

In one aspect, methods are provided of processing high service temperature crosslinked thermoplastic gels. The provided methods include a method for processing a high temperature crosslinked thermoplastic gel comprising (1) combining (a) an oil-swelled physically crosslinked thermoplastic elastomer gel comprising at least one functional group configured to chemically crosslink in the presence of a crosslinker and (b) a crosslinker, (2) maintaining the combination of the physically crosslinked thermoplastic elastomer gel and the crosslinker at a temperature at which they remain substantially unreacted; (3) subsequently heating the combination to a temperature at which the oil-swelled physically crosslinked thermoplastic elastomer gel reacts with the crosslinker.

In another aspect, methods are provided for making a thermoset object with an oil-swelled physically crosslinked thermoplastic elastomer gel comprising (1) combining into a cold slurry (a) an oil-swelled physically crosslinked thermoplastic elastomer gel comprising at least one functional group configured to chemically crosslink in the presence of a crosslinker, wherein the oil-swelled physically crosslinked thermoplastic elastomer gel comprises (i) a char catalyst, (ii) a char former, (iii) a blowing agent, (iv) a maleic anhydride-modified SEBS, (v) a softener oil, and (vi) at least one stabilizer, and (b) a crosslinker, (2) maintaining the cold slurry at a temperature at which the combination remains substantially unreacted; (3) subsequently heating the combination with a hot static mixer to a temperature at which the oil-swelled physically crosslinked thermoplastic elastomer gel reacts with the crosslinker to form a chemically crosslinked thermoset object; (4) transferring the hot molten gel into an injection molder; and (5) forming a chemically crosslinked thermoset object with flame retardancy sufficient to pass the UL-94 test.

BRIEF DESCRIPTION OF THE FIGURES

FIG. 1 is a flow chart of a method making a thermoset object with an oil-swelled physically crosslinked thermoplastic elastomer gel.

DETAILED DESCRIPTION

Figure 2:
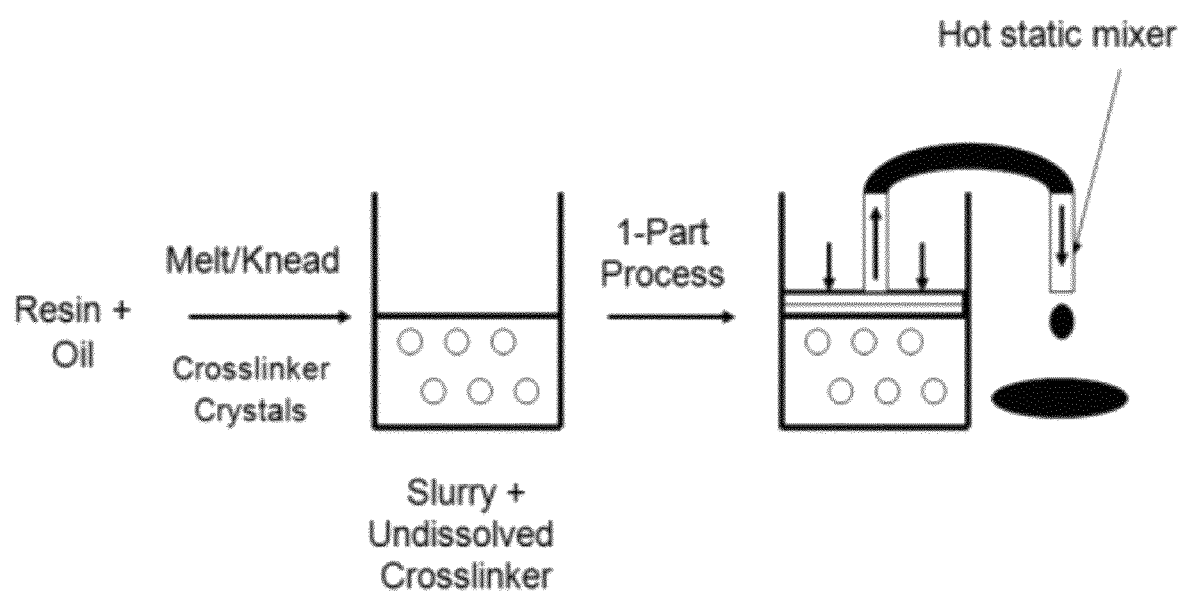
FIG. 2 is a diagram of a system for making a thermoset object with an oil-swelled gel.

As used herein, terms such as "typically" are not intended to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

As used herein the terms "comprise(s)," "include(s)," "having," "has," "contain(s)," and variants thereof, are intended to be open-ended transitional phrases, terms, or words that do not preclude the possibility of additional acts or structure.

Any concentration range, percentage range, or ratio range recited herein are to be understood to include concentrations, percentages or ratios of any integer within that range and fractions thereof, such as one tenth and one hundredth of an integer, unless otherwise indicated. Also, any number range recited herein relating to any physical feature, such as polymer subunits, size or thickness, are to be understood to include any integer within the recited range, unless otherwise indicated. It should be understood that the terms "a" and "an" as used above and elsewhere herein refer to "one or more" of the enumerated components. For example, "a" polymer refers to one polymer or a mixture comprising two or more polymers.

Processing of High Service Temperature Hydrocarbon Gels

In general, the methods described herein include combining an oil-swelled physically crosslinked thermoplastic elastomer gel and a crosslinker, maintaining the combination of the physically crosslinked thermoplastic elastomer gel and the crosslinker at a temperature at which they remain substantially unreacted; and subsequently heating the combination to a temperature at which the oil-swelled physically crosslinked thermoplastic elastomer gel reacts with the crosslinker. A temperature at which the crosslinker and thermoplastic gel are substantially reacted is any temperature that allows these two ingredients to exist, optionally in the presence of other components, without undergoing substantial chemical crosslinking. In some embodiments, the slurried combination of oil, oil-swelled thermoplastic elastomer resin and a chemical crosslinker flows relatively freely when poured prior to being reacted with heat.

When a physically crosslinked gel reacts with a crosslinker, the resulting gel becomes increasingly chemically crosslinked. Eventually, the combination becomes sufficiently reacted to product an object that is chemically crosslinked. Upon cooling, the chemically crosslinked gel will produce a thermoset object. The resulting thermoset object is irreversibly cured and may be suitable for high service temperatures. In some embodiments, the thermoset object exhibits a high level of flame retardancy. For example, in some embodiments, the method processing gels produces a chemically crosslinked get with flame retardancy sufficient to pass the UL-94 test.

FIG. 2 shows an example of a system for making a thermoset object with an oil-swelled thermoplastic gel and a crosslinker. The cold slurry is poured into a drum which is sent to a specific location where it is dispensed. A drum unloader with a cold platen may be used to dispense the slurry. The slurry then flows through a hot static mixer. In this embodiment, the hot static mixer simultaneously heats the gel and mixes the composition comprising the gel and crosslinker fully. The mixed, hot molten gel is then inserted into an injection molder to mold parts.

In one embodiment, the oil-swelled physically crosslinked thermoplastic elastomer gel and crosslinker are maintained in a cold slurry. In such embodiments, at least a portion of the physically crosslinked thermoplastic elastomer gel and at least a portion of the crosslinker are in solid form and exist together in a mixture with a suitable liquid. In another embodiment, the crosslinker is a liquid at the temperature at which it remains substantially unreacted with the oil-swelled thermoplastic elastomer gel. Various temperatures and conditions are suitable based on the properties of the crosslinker, thermoplastic elastomer gel, and other components. In one embodiment, the cold slurry is maintained at room temperature. In another embodiment, the cold slurry is maintained between 15° C. and 40° C. In another embodiment, the cold slurry is maintained between 60° C. and 100° C. for a short period of time. In yet a further embodiment, the cold slurry is maintained between 160° C. and 800° C. for a shorter period of time. In another embodiment, the cold slurry is maintained for a period of time at room temperature, then mixed at 175° C. Throughout, the oil-swelled physically crosslinked thermoplastic elastomer gel and crosslinker remain substantially unreacted. In another embodiment, the cold slurry is mixed at between 140° C. and 200° C. In another embodiment, the cold slurry is maintained substantially unreacted and mixed at between 160° C. and 180° C. In other embodiments, the cold slurry is transitioned through multiple heating zones where it is mixed, but remains substantially unreacted.

In some embodiments, the heating step is performed simultaneously along with a mixing step. In other embodiments, the heating step creates a hot molten gel. In further embodiments, the heating step is preceded by the mixing step. In one embodiment, the heating and mixing is performed with a hot static mixer. Any hot static mixer suitable for mixing and heating the materials described herein may be used. For example, hot static mixers are available from Henschel, Becton-Dickenson, Sulzer Corporation, and Koflo Corporation.

In the heating step, the combination of the physically crosslinked thermoplastic elastomer gel and the crosslinker are heated to a temperature at which the oil-swelled physically crosslinked thermoplastic elastomer gel reacts with the crosslinker. For example, in one embodiment, the combination is heated until at least 200° C. In another embodiment, the combination is heated until at least 220° C. In another embodiment, the combination is heated until at least 240° C. Various temperatures and conditions are suitable based on the properties of the crosslinker, thermoplastic elastomer gel, and other components.

In one embodiment, the heated combination of oil-swelled physically crosslinked thermoplastic elastomer gel and crosslinker is transferred to an injection molder. In these embodiments, the injection molder is used to form a chemically crosslinked thermoset object. In other embodiments, the hot molten gel is poured into a part or a mold.

Oil-Swelled Physically Crosslinked Thermoplastic Elastomer Gels

The oil-swelled physically crosslinked thermoplastic elastomer gel includes at least one functional group configured to chemically crosslink in the presence of a crosslinker. For example, the oil-swelled physically crosslinked thermoplastic elastomer may have available acyls, hydroxyls, sulfhydryls, amines, carboxyls, anhydrides, and carboxylic acids.

In one embodiment, the oil-swelled physically crosslinked thermoplastic elastomer gel is a physically crosslinked styrenic block copolymer. The oil-swelled physically crosslinked thermoplastic elastomer gel may be any such configured polymers such as KRATON MD6684, KRATON RP6684, KRATON FG190, KRATON FG1924, KRATON RP6670, KRATON 1901, KRATON 1901X, KRATON B 51-4, KRATON FG 120LX, KRATON FG 1652, KRATON FG 19, KRATON FG 1900X, KRATON FG 1901, KRATON FG 1901X, KRATON FG 1901X951, KRATON FG 1921X, KRATON FG 1924, KRATON FG 1924X, KRATON FG 1961X, KRATON G 1901, KRATON G 1901X, KRATON G 1901X2, KRATON G 1921, KRATON GRP 6627, KRATON KG 1901, KRATON M 1923, KRATON MB 1000, KRATON RP 6509, KRATON RP 6510, KRATON RP 6543, and KRATON RP 6562 (available from Kraton Polymers (Houston, Tex.), and Asahi M 1913, M 1943, and M 1953 (available from Asahi Chemical Industry Co., Ltd., Tokyo, Japan).

In another embodiment, the oil-swelled physically crosslinked thermoplastic elastomer gel includes maleic anhydride grafted to the block copolymer. The maleated functional groups are examples of functional groups configured for crosslinking during gel processing. These oil-swelled physically crosslinked thermoplastic elastomer gels are particularly configured for crosslinking with di- and multi-amine crosslinkers, as well as aluminum, titanium and other organometallic compounds. In some embodiments, the oil-swelled physically crosslinked thermoplastic elastomer gel includes at least one functional group configured to chemically crosslink with a di- and multi-amine crosslinker.

Figure 3:
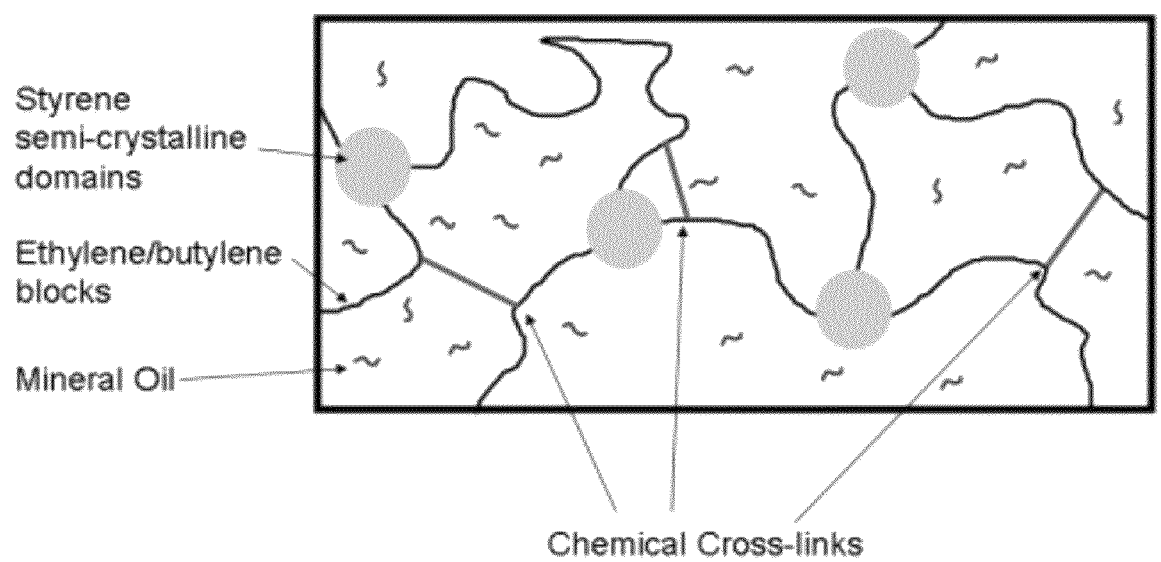
FIG. 3 is a diagram representing the structural enhancement of SEBS triblock gels upon chemically crosslinking the ethylene/butylenes blocks.
Figure 4:
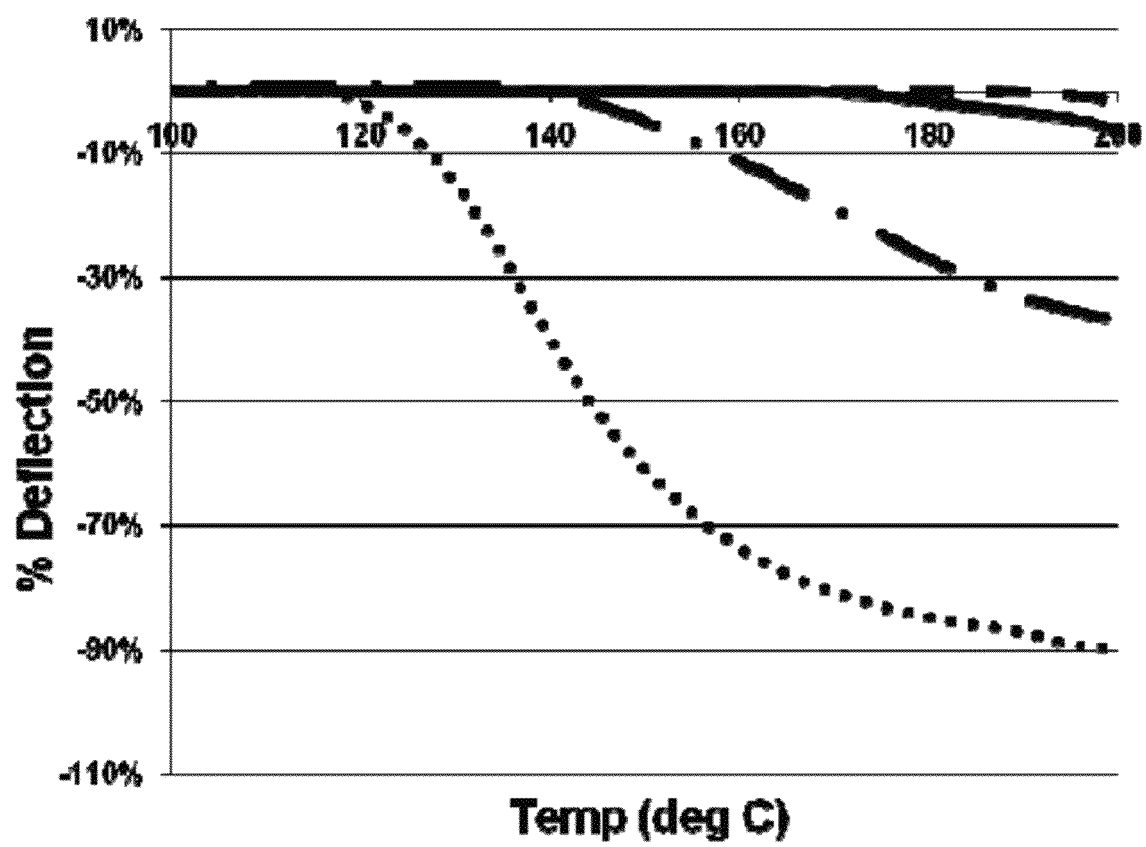
FIG. 4 is a graph showing the softening temperature from flame retardant TPEG and crosslinked TPEG ("XTPEG").

For further example, the maleated functional groups of a maleic anhydride-modified SEBS are configured for crosslinking. Not wishing to bound by theory, but it is believed that chemical crosslinking of the SEBS triblocks at the ethylene-butylene blocks further strengthens the gel structure. See FIG. 3. The chemical crosslinking produced is capable of raising its softening temperature. See FIG. 4.

Methods of preparing maleated block copolymers are known in the art and many such block copolymers are commercially available. For example, maleated block copolymers are disclosed in EP 0879832A1. Illustrative commercially available maleic anhydride-modified SEBS are available from Kraton Polymers (Houston, Tex.) as KRATON FG1901 (SEBS polymer having a polystyrene content of about 30 wt % and maleic anhydride grafted content of about 1.4-2.0 wt %) and KRATON FG 1924 G (SEBS polymer with about 13 wt % polystyrene and maleic anhydride grafted content of about 0.7-1.3 wt %), and KRATON MD 6684 CS (SEBS polymer having a polystyrene content of about 30 wt % and maleation level of about 1.0 wt %), and KRATON MD 6670. Illustrative commercially available maleic anhydride-modified SEBS are available from Asahi Chemical Industry Co., Ltd. (Tokyo, Japan) under the trade name M-1911 (maleation level of about 3.0 wt %), M-1913 (maleation level of about 2.0 wt %), and M-1943.

In one embodiment, the maleic anhydride modified SEBS is KRATON MD6684CS. In another embodiment, the maleic anhydride-modified SEBS is KRATON FG6684. In yet another embodiment, the maleic anhydride modified SEBS is selected from the group consisting of as KRATON FG1901, KRATON FG 1924 G, KRATON MD 6684 CS, and KRATON MD 6670. In another embodiment, the maleic anhydride-modified SEBS has a maleation level of between 1.0 wt % and 3.0 wt %.

Oil-swelled physically crosslinked thermoplastic gels may be oil-swelled with a softener oil. In other embodiments, the oil-swelled physically crosslinked thermoplastic gels are polymers described in the co-pending, commonly assigned patent application Ser. No. 12/954,560 entitled "Crosslinked Flame Retardant Thermoplastic Elastomer Gels", filed the same day as this application.

Crosslinkers

The methods include a crosslinker that can chemically crosslink a physically crosslinked oil-swelled thermoplastic elastomer gel. The crosslinking is achieved with a crosslinker. Any crosslinker capable of reacting with the functionalized hard and soft block regions can be utilized. In one embodiment, the chemical crosslinking involves ionic crosslinking. In other embodiments, the chemical crosslinking involves covalent crosslinking.

In one embodiment, the crosslinker is a metal salt. In another embodiment, the crosslinker is aluminum acetylacetonate. In further embodiments, the crosslinker is selected from the group consisting of aluminum acetylacetonate, zinc acetylacetonate, titanium acetylacetonate and zirconium acetylacetonate, and mixtures thereof. In one embodiment, the crosslinker is an aluminum salt of acetic acid. For example, the crosslinker may be an aluminum triacetate (Al $(C_2H_3O_2)_3$), aluminum diacetate, (HO(Al($C_2H_3O_2)_3$)), or aluminum monoacetate, ((HO)$_2$(Al($C_2H_3O_2)_3$). In another embodiment, the crosslinker is tetra(2-ethylhexyl)titanate.

In other embodiments, the crosslinker is an amine crosslinker. In further embodiments, the amine crosslinker is selected from the group consisting of an organic amine, an organic diamine, and an organic polyamine. In other embodiments, the amine crosslinker is selected from the group consisting of ethylene diamine; 1,2- and 1,3-propylene diamine; 1,4-diaminobutane; 2,2-dimethylpropane diamine-(1,3); 1,6-diaminohexane; 2,5-dimethylhexane diamine-(2,5); 2,2,4-trimethylhexane diamine-(1,6); 1,8-diaminooctane; 1,10-diaminodecane; 1,11-undecane diamine; 1,12-dodecane diamine; 1-methyl-4-(aminoisopropyl)-cyclohexylamine-1; 3-aminomethyl-3,5,5-trimethyl-cyclohexylamine-(1); 1,2-bis-(aminomethyl)-cyclobutane; p-xylylene diamine; 1,2- and 1,4-diaminocyclohexane; 1,2-; 1,4-; 1,5- and 1,8-diaminodecalin; 1-methyl-4-aminoisopropyl-cyclohexylamine-1; 4,4'-diamino-dicyclohexyl; 4,4'-diamino-dicyclohexyl methane; 2,2'-(bis-4-amino-cyclohexyl)-propane; 3,3'-dimethyl-4,4'-diamino-dicyclohexyl methane; 1,2-bis-(4-aminocyclohexyl)-ethane; 3,3',5,5'-tetramethyl-bis-(4-aminocyclohexyl)-methane and -propane; 1,4-bis-(2-aminoethyl)-benzene; benzidine; 4,4'-thiodianiline, dianisidine; 2,4-toluenediamine, diaminoditolylsulfone; 2,6-diaminopyridine; 4-methoxy-6-methyl-m-phenylenediamine; diaminodiphenyl ether; 4,4'-bis(o-toluidine); o-phenylenediamine; o-phenylenediamine, methylenebis(o-chloroaniline); bis(3,4-diaminiophenyl)sulfone; diaminiodiphenylsulfone; 4-chloro-o-phenylenediamine; m-aminobenzylamine; m-phenylenediamine; 4,4'-$C_1$-$C_6$-dianiline such as 4,4'-methylenedianiline; aniline-formaldehyde resin; and trimethylene glycol di-p-aminobenzoate and mixtures thereof.

In further embodiments, the amine crosslinker is selected from the group consisting of bis-(2-aminoethyl)-amine, bis-(3-aminopropyl)-amine, bis-(4-aminobutyl)-amine and bis-(6-aminohexyl)-amine, and isomeric mixtures of dipropylene triamine and dibutylene triamine. In yet further embodiments, the amine crosslinker is selected from the group consisting of hexamethylene diamine, tetramethylene diamine, and dodecane diamine and mixtures thereof.

In other embodiments, the crosslinker is a polyol crosslinker. In further embodiments, the polyol crosslinker is selected from the group consisting of polyether-polyols, polyester-polyols, branched derivatives of polyether-polyols (derived from, e.g., glycerine, sorbitol, xylitol, mannitol, glucosides, 1,3,5-trihydroxybenzene), branched derivatives of polyether-polyols (derived from, e.g., glycerine, sorbitol, xylitol, mannitol, glucosides, 1,3,5-trihydroxybenzene), orthophthalate-based polyols, ethylene glycol-based polyols, diethylene glycol-based aromatic and aliphatic polyester-polyols. In further embodiments, the polyol crosslinker is selected from the group consisting of 1,2-propanediol, 1,3-propanediol, diethanolamine, triethanolamine, N,N,N',N'-[tetrakis(2-hydroxyethyl)ethylene diamine], N,N,-diethanolaniline. In other embodiments, the polyol crosslinker is selected from the group consisting of polycaprolactone diol, poly(propylene glycol), poly(ethylene glycol), poly(tetramethylene glycol), and polybutadiene diol and their derivatives or copolymers.

Optional Ingredients

Inhibitors

The temperature at which the gel and crosslinker can be maintained will depend on the properties of gel and crosslinker, as well as any additional ingredients. For example, an effective amount of an inhibitor or a plurality of inhibitors may be added which can raise the temperature at which the gel and crosslinker may be maintained without being substantially reacted. In one embodiment, the inhibitor is 2,4 pentanedione. In another embodiments, inhibitor is selected from the group of phenothiazine; methylic ether of hydroquinone; N,N-diethyl-hydroxyamine; nitrobenzene; di-tert-butylcatechol; hydroquinone; p-anilinophenol; di-(2-ethylhexyl)-octylphenyl phosphate; 2,5-di-tert-butyl-4-hydroxy-toluene; methylene blue and mixtures thereof.

Char Catalysts

The oil-swelled physically crosslinked thermoplastic elastomer gel may include a char catalyst. In one embodiment, the char catalyst is a linear polymer catalyst. In another embodiment, the char catalyst is a polymer catalyst that is at least partially branched. In one embodiment, the char catalyst has a chain length of less than about 1000 monomers. In another embodiment, the char catalyst has a chain length of less than about 100 monomers. In yet another embodiment, the char catalyst has a chain length of less than about 60 monomers.

In one embodiment, the char catalyst is an ammonium polyphosphate, having the following formula:

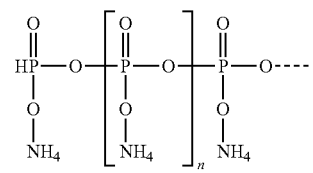

where n indicates chain length.

In another embodiment, the ammonium polyphosphates may be coated or uncoated. Coated ammonium polyphosphates have an added coating made of, for example, surface reacted silane. A coating may alter the characteristics of the ammonium polyphosphate. For example, a coating may reduce the solubility in water, result in a product that is less acidic or less abrasive. In one embodiment, the ammonium polyphosphate is uncoated. In another embodiment, the ammonium polyphosphate is a coated ammonium polyphosphate. In yet another embodiment, the coated ammonium polyphosphate includes formaldehyde. To form the coating, the formaldehyde may itself be reacted with other components such as melamine. Illustrative commercially available char catalysts are available from Budenheim (Zaragoza, Spain) such as FR CROS C30, C60, C70, from Ciba (Basle, Switzerland) such as MELAPUR MP and from Wellchem International Ltd. (Hangzhou, China) such as EXFLAM APP 201.

In another embodiment, the char catalyst is an acid salt. In yet another embodiment, the char catalyst is a salt of phosphoric acid. In yet another embodiment, the char catalyst is a salt of sulfuric acid. In another embodiment, the char catalyst is melamine monophosphate.

Char Formers

The oil-swelled physically crosslinked thermoplastic elastomer gel may include a char former. Upon burning, certain materials char when they are burned. The presence of char may inhibit in full or in part the spread of flame by acting as a thermal barrier around the unburned material. The char former crosslinks the polymer gel when exposed to flame and the char catalyst.

The char former may be configured to provide adequate pendant hydroxyls for performance. In one embodiment, the char former is a polyol such as pentaerythritol or dipentaerythritol. In one embodiment, the char former is selected from the group consisting of a polyol, a polysaccharide, an aminoplast such as tris(hydroxyethyl)isocyanurate (THEIC), and mixtures thereof. In another embodiment the char former is pentaerythritol.

Softener Oils

The oil-swelled physically crosslinked thermoplastic elastomer gel may include a softener oil. In one embodiment, the softener oil is a mineral oil. In yet another embodiment, the softener oil is a paraffin oil. In other embodiments, the softener oil is a napthenic oil. In yet other embodiments, the softener oil is an aromatic oil. In a further embodiment, the softener oil is a mixture of different types of oils.

In one embodiment, the softener oil is a polyalpha olefin. Polyalpha olefins are hydrogenated synthetic hydrocarbon fluids used in a large number of automotive, electrical, and other industrial applications. DURASYN polyalpha olefins are authorized for use as components of non-food articles and are considered non-toxic. DURASYN 148 polyalphaolefin is a fully synthesized hydrogenated hydrocarbon base fluid produced from $C_{12}$ linear alphaolefin feed stocks and available from INEOS Oligomers, Houston, Tex.

Other suitable softener oils are known in the art, and others are disclosed in EP 0879832A1. In another embodiment, the softener oil is a linear alpha olefin. In yet another embodiment, the softener oil is a white mineral oil. An illustrative commercially available mineral oil is HYDROBRITE 380 PO (Sonneborn).

Blowing Agents

The oil-swelled physically crosslinked thermoplastic elastomer gel may include a blowing agent. Upon heating, the blowing agent may generate gases that will cause a gel to foam or expand. In one embodiment, the blowing agent is selected from melamine, melamine cyanurate, melamine borate, melamine phosphate, and melamine derivatives. In another embodiment, the blowing agent is melamine. A suitable melamine cyanurate may be supplied by Budenheim Iberica Commercial S.A. under the trade name BUDIT 315, or by Ciba Geigy under the trade name MELAPUR.

Stabilizers

In some embodiments, the gels contain at least one stabilizer. Stabilizers include antioxidants, light and UV absorbers/stabilizers, heat stabilizers, metal deactivators, free radical scavengers, carbon black, and antifungal agents.

In one embodiment, the stabilizer is an ester of a hindered phenol. "Ester of a hindered phenol," as used to define one of the components, is intended to cover compounds based on a hindered phenol nucleus (a phenolic structure flanked by two ortho sterically hindering groups, such as t-butyl) which contains an ester substituent, such as —$CH_2CH_2C(O)OR$, where R can be long chain alkyl, such as $C_{16}$-$C_{18}$. In one embodiment, the stabilizer is octadecyl 3,5-di-tert-butyl-4-hydroxyhydrocinnamate, which is commercially available as IRGANOX 1076 from Ciba Geigy. In other embodiments, more than one stabilizer is used. For example, in one embodiment, the gel contains a mixture of IRGANOX 1076, IRGANOX B225 (Ciba), TINUVIN 327 (Ciba), and METASOL TK-100 (Lanxess).

Additional Styrenic Block Copolymers

Many styrenic block copolymers are known in the art and many block copolymers are commercially available. Illustrative commercially available hydrogenated styrenic block copolymers include the polystyrene-poly(ethylene-propylene) diblock copolymers available from Kraton Polymers as KRATON G1701 and G1702; the polystyrene-poly(ethylene-butylene)-polystyrene triblock copolymers available from Kraton Polymers as KRATON G1641, G1650, G1651, G1654, G1657, G1726, G4609, G4610, GRP-6598, RP-6924, MD-6932M, MD-6933, and MD-6939; the polystyrene-poly(ethylene-butylene-styrene)-polystyrene (S-EB/S-S) triblock copolymers available from Kraton Polymers as KRATON RP-6935 and RP-6936, the polystyrene-poly(ethylene-propylene)-polystyrene triblock copolymers available from Kraton Polymers as KRATON G1730; the polystyrene-poly(ethylene-butylene)-polystyrene triblock copolymer comprising 67 wt % polystyrene available from Asahi Kasei Elastomer as TUFTEC H1043; the polystyrene-poly(ethylene-butylene)-polystyrene triblock copolymer comprising 42 weight percent polystyrene available from Asahi Kasei Elastomer as TUFTEC H1051; the polystyrene-poly(butadiene-butylene)-polystyrene triblock copolymers available from Asahi Kasei Elastomer as TUFTEC P1000 and 2000; the polystyrene-polybutadiene-poly(styrene-butadiene)-polybutadiene block copolymer available from Asahi Kasei Elastomer as S.O.E.-SS L601; the polystyrene-poly(ethylene-butylene)-polystyrene triblock copolymer comprising about 60 wt % polystyrene available from Kuraray as SEPTON S8104; the polystyrene-poly(ethylene-ethylene/propylene)-polystyrene triblock copolymers available from Kuraray as SEPTON® S4044, S4055, S4077, and S4099; and the polystyrene-poly(ethylene-propylene)-polystyrene triblock copolymer comprising about 65 wt % polystyrene available from Kuraray as SEPTON® S2104. Mixtures of two or more block copolymers may be used. Illustrative commercially available unhydrogenated block copolymers include the Kraton D series polymers, including KRATON D1101 and D1102, from Kraton Polymers, and the styrene-butadiene radial teleblock copolymers available as, for example, K-RESIN KR01, KR03, KR05, and KR10 sold by Chevron Phillips Chemical Company. In another embodiment, the styrenic block copolymer is a mixture of high melt viscosity SEBS block copolymer and a functionalized SEBS block copolymer.

Other Optional Components

The compositions and methods are not limited to the types of components listed here. Other common components may also be included in the compositions used according to the methods disclosed. For example, the compositions may include coloring agents, fillers, dispersants, flow improvers, plasticizers, and/or slip agents.

EXAMPLES

Example 1

The system of FIG. 2 can be used to make a thermoset object with an oil-swelled theromoplastic gel and a crosslinker. A room temperature slurry of the softener oil, block copolymers, stabilizers, and flame retardant additives is created using a Henschel mixer. The cold slurry is then poured into a drum. The drum is sent to a specific location where it is dispensed. A drum unloader with a room temperature platen is used to dispense the slurry. The slurry then flows through a hot static mixer. In this configuration, the hot static mixer simultaneously heats the gel and mixes the composition comprising the gel and crosslinker fully. The mixed, hot molten gel is then inserted into an injection molder to mold parts.

Example 2

The following flame retardant gel, in which the percentages are given as weight percent of the total gel composition, can be processed according to the described methods.

|  | Weight % |
| --- | --- |
| KRATON MD6684 CS | 2 |
| KRATON G1701 | 5 |
| Stabilizer Composition | 1 |
| DURASYN 148 | 52 |
| Flame Retardant Mixture | 40 |

A flame retardant gel was prepared as follows. A flame retardant mixture was made of ammonium polyphosphate, FR CROS C60 from Budenheim, (Zaragoza, Spain), melamine (Sigma-Aldrich) and pentaerythritol (CHARMOR PM40 Perstorp) in a 3:1:1 ratio. A stabilizer composition was made of IRGANOX 1076 (Ciba), IRGANOX B225 (Ciba), TINUVIN 327 (Ciba), METASOL TK-100 (Lanxess) in a 1:1:1:0.12 ratio. The resulting gel had about a 20 g hardness measured using a texture analyzer. The resulting gel is also thermomechanically stable at high service temperatures (approximately 120° C.). Flame-retardancy was measured using the Underwriters Laboratory standard UL 94. The resulting gel was found to be highly flame retardant (V-0 on the UL-94 vertical burn test).

Example 3

The following flame retardant gel, in which the percentages are given as weight percent of the total gel composition, can be processed according to the described methods.

|  | Weight % |
| --- | --- |
| KRATON MD6684 CS | 3 |
| KRATON G1701 | 2 |
| Stabilizer Composition | 0.78 |
| HYDROBRITE 380 PO | 44.22 |
| Flame Retardant Mixture | 50 |

The stabilizer composition was made of IRGANOX 1076 (Ciba), IRGANOX B225 (Ciba), TINUVIN 327 (Ciba), METASOL TK-100 (Lanxess) in a 1:1:1:0.12 ratio. The resulting gel was found to be highly flame retardant (V-0 on the UL-94 vertical burn test).

Although examples have been described herein, it should be appreciated that any subsequent arrangement designed to achieve the same or similar purpose may be substituted for the specific examples shown. This disclosure is intended to cover any and all subsequent adaptations or variations of various examples. Combinations of the above examples, and other examples not specifically described herein, may be apparent to those of skill in the art upon reviewing the description.

The Abstract is provided with the understanding that it will not be used to interpret or limit the scope or meaning of the claims. In addition, in the foregoing Detailed Description, various features may be grouped together or described in a single example for the purpose of streamlining the disclosure. This disclosure is not to be interpreted as reflecting an intention that the claimed examples require more features than are expressly recited in each claim. Rather, as the following claims reflect, inventive subject matter may be directed to less than all of the features of any of the disclosed examples. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other examples, which fall within the true spirit and scope of the description. Thus, to the maximum extent allowed by law, the scope is to be determined by the broadest permissible interpretation of the following claims and their equivalents, and shall not be restricted or limited by the foregoing detailed description.

What is claimed is:

1. A method for processing a high temperature crosslinked thermoplastic gel comprising:
   combining
   (a) an oil-swelled physically crosslinked thermoplastic elastomer gel comprising at least one functional group configured to chemically crosslink in the presence of a crosslinker and
   (b) a crosslinker;
   maintaining the combination of the physically crosslinked thermoplastic elastomer gel and the crosslinker at a temperature at which they remain substantially unreacted; and
   subsequently heating the combination to a temperature at which the oil-swelled physically crosslinked thermoplastic elastomer gel reacts with the crosslinker.

2. The method of claim 1, further comprising the step of mixing the combination of the physically crosslinked thermoplastic elastomer gel and the crosslinker.

3. The method of claim 1, wherein the combination of the physically crosslinked thermoplastic elastomer gel and the crosslinker are maintained in a cold slurry.

4. The method of claim 2, wherein the heating is performed with a hot static mixer to create a hot molten gel.

5. The method of claim 4, further comprising the step of transferring the hot molten gel into an injection molder.

6. The method of claim 4, further comprising the step of transferring the hot molten gel into a molding part.

7. The method of claim 1, wherein the oil-swelled physically crosslinked thermoplastic elastomer gel comprises maleic anhydride-modified SEBS.

8. The method of claim 1, wherein the oil-swelled physically crosslinked thermoplastic elastomer gel comprises a carboxylic acid modified polymer.

9. The method of claim 7, wherein the oil-swelled physically crosslinked thermoplastic elastomer gel further comprises a char catalyst.

10. The method of claim 9, wherein the char catalyst is a coated ammonium polyphosphate.

11. The method of claim 1, wherein the oil-swelled physically crosslinked thermoplastic elastomer gel further comprises a char former.

12. The method of claim 11, wherein the char former is pentaerythritol.

13. The method of claim 1, wherein the crosslinker comprises a metal salt.

14. The method of claim 12, wherein the crosslinker is selected from the group consisting of aluminum acetylacetonate, zinc acetylacetonate, titanium acetylacetonate and zirconium acetylacetonate.

15. The method of claim 13, wherein the crosslinker is aluminum acetylacetonate.

16. The method of claim 1, wherein the oil-swelled physically crosslinked thermoplastic elastomer gel further comprises a blowing agent.

17. The method of claim 16, wherein the blowing agent is melamine.

18. The method of claim 1, wherein the crosslinker is a liquid prior to the step of heating the mixture.

19. The method of claim 18, wherein the crosslinker is tetraethylenepentamine.

20. The method of claim 1, further comprising the step of forming a chemically crosslinked thermoset object with flame retardancy sufficient to pass the UL-94 test.

21. The method of claim 1, wherein the oil-swelled physically crosslinked thermoplastic elastomer gel and crosslinker are further combined with
(c) an inhibitor.

22. The method of making a thermoset object with an oil-swelled physically crosslinked thermoplastic elastomer gel comprising
 combining into a cold slurry
  (a) an oil-swelled physically crosslinked thermoplastic elastomer gel comprising at least one functional group configured to chemically crosslink in the presence of a crosslinker, wherein the oil-swelled physically crosslinked thermoplastic elastomer gel comprises
   (i) a char catalyst,
   (ii) a char former,
   (iii) a blowing agent,
   (iv) a maleic anhydride-modified SEBS,
   (v) a softener oil, and
   (vi) at least one stabilizer, and
  (b) a crosslinker;
 maintaining the cold slurry at a temperature at which the combination remains substantially unreacted;
 subsequently heating the combination with a hot static mixer to a temperature at which the oil-swelled physically crosslinked thermoplastic elastomer gel reacts with the crosslinker to form a chemically crosslinked thermoset object;
 transferring the hot molten gel into an injection molder; and
 forming a chemically crosslinked thermoset object with flame retardancy sufficient to pass the UL-94 test.

* * * * *